(12) United States Patent
Ament et al.

(10) Patent No.: US 6,334,562 B1
(45) Date of Patent: Jan. 1, 2002

(54) STOWAGE DEVICE, ESPECIALLY FOR A REMOVABLE ARRANGEMENT IN A MOTOR VEHICLE

(75) Inventors: Eduard Ament, Aichwald; Holger Seel, Aidlingen, both of (DE)

(73) Assignee: Baumeister & Ostler GmbH & Co., Aichwald/Aichschiess (DE)

( * ) Notice: Subject to any disclaimer, the term of this patent is extended or adjusted under 35 U.S.C. 154(b) by 0 days.

(21) Appl. No.: 09/276,899

(22) Filed: Mar. 26, 1999

(30) Foreign Application Priority Data

Apr. 3, 1998 (DE) ............................................. 198 14 967

(51) Int. Cl.⁷ ...................................................... B60R 7/00
(52) U.S. Cl. ........................ 224/563; 224/404; 224/411; 224/543
(58) Field of Search .................................... 224/563, 411, 224/404, 543; 383/33, 34, 34.1; 296/37.13, 37.16

(56) References Cited

U.S. PATENT DOCUMENTS

| | | | | |
|---|---|---|---|---|
| 777,214 A | * | 12/1904 | Lighthouse | 383/34.1 |
| 1,859,773 A | * | 5/1932 | Hiering | 150/122 |
| 2,202,651 A | * | 5/1940 | Freidman | 150/120 |
| 2,507,842 A | * | 5/1950 | Waddill | 224/563 |
| 2,693,212 A | * | 11/1954 | Guichard | 383/34 |
| 4,368,767 A | * | 1/1983 | Friedman | 150/120 |
| 4,948,266 A | * | 8/1990 | Bencic | 383/34 |
| 5,340,004 A | * | 8/1994 | Moore | 224/563 |
| 5,368,210 A | * | 11/1994 | Wotring | 224/563 |
| 5,628,442 A | * | 5/1997 | Wayne | 224/543 |
| 6,164,821 A | * | 12/2000 | Randall | 383/34 |

* cited by examiner

Primary Examiner—Gregory M. Vidovich
Assistant Examiner—Maerena W. Brevard
(74) Attorney, Agent, or Firm—Crowell & Moring LLP

(57) ABSTRACT

A stowage device in the form of a storage receiving net is attached at a vehicle storage space. A supporting structure is associated with an open side of the receiving net, to spread the open side in a functional position that exposes the interior of the pocket.

32 Claims, 5 Drawing Sheets

STOWAGE DEVICE, ESPECIALLY FOR A REMOVABLE ARRANGEMENT IN A MOTOR VEHICLE

BACKGROUND AND SUMMARY OF THE INVENTION

This application claims the priority of German application 198 14 967.0, filed in Germany on Apr. 3, 1998, the disclosure of which is expressly incorporated by reference herein.

The invention relates to a stowage device, especially for a removable arrangement in a motor vehicle, with at least one flexible receiving pocket that provides access to the interior of the pocket from one open side.

Stowage devices of this kind are described in not previously published older German patent applications 197 32 403. 7 and 197 32 404. 5. The stowage device is defined as a flexible mesh net that is closed at its edges except for a top side. The open top side thus provides access to the interior of the mesh net. The side edges of the open top side are provided with pull cords that are preferably inelastic. The cords have hanging loops on at least two opposite sides. By means of these hanging loops, the mesh net that forms a receiving pocket can be hung on retaining buttons integral with the vehicle in a trunk or cargo compartment of a motor vehicle. In a functional state positioned in the motor vehicle, in which the loops have been hung on the buttons integral with the vehicle, the inelastic pull cords and hence the side edges are under tensile stress, so that the side edges of the receiving pocket abut one another.

Hence a goal of the invention is to provide a stowage device of the species recited at the outset that permits an improved stowage of objects.

This goal is achieved with preferred embodiments of the invention by virtue of the fact that a support structure is associated with the open side, said structure spreading the open side in a functional position that exposes the interior of the pocket. In contrast to the prior art, the solution according to the invention avoids the need to spread the side edges of the open side manually before putting away an object in the receiving pocket. The solution according to the invention instead allows an extremely simple access since the supporting structure spreads the open side sufficiently so that objects can readily be inserted into the interior of the pocket or can be removed therefrom.

The solution according to the invention is especially advantageous for a stretched arrangement of the flexible receiving pocket between mounts that are integral with the vehicle in a motor vehicle, as shown in the not previously published German patent applications 197 32 403. 7 and 197 32 404. 5. A suitable object such as a suitcase or the like can be inserted with one hand into the spread receiving pocket without having to spread the side edges first using the other hand. The stowage device is advantageously designed as a mesh net similarly to the patent applications listed above. Of course, the stowage device is not limited in this way. It can also be made in similar fashion from other flexible materials such as textile or plastic flat structures. The solution according to the invention also relates to other stowage devices whose open sides are provided with side edges that are opposite one another and abut one another tightly in the resting position, so that access to the interior of the pocket is not readily provided in the resting position.

In certain preferred embodiments of the invention, the supporting structure has at least two cross struts that are spaced apart from one another, extend between opposite side edges of the receiving pocket, and are rigid, at least in the functional position. This is an especially simple and sturdy design for spreading the open side of the receiving pocket.

In certain preferred embodiments of the invention, the cross struts are mounted releasably on the side edges. As a result, the stowage device can be accommodated compactly in the resting position.

In certain preferred embodiments of the invention, each cross strut is designed to be foldable by means of at least one hinge arrangement. As a result, the open side can be opened and closed in simple fashion.

In certain preferred embodiments of the invention, the hinge arrangement is provided with stops by means of which the hinge arrangement is secured in its functional position in a top dead center position. As a result, assurance is provided that the cross struts will not fold inadvertently, so that reliable spreading can be produced in the functional position.

In certain preferred embodiments of the invention, the supporting structure has a supporting frame that extends between the opposite side edges and is rigid at least in the functional position. The supporting frame performs the function of the cross struts and also stabilizes the side edges of the open side itself, so that an especially stable spreading of the open side of the receiving pocket is achieved.

In certain preferred embodiments of the invention, the supporting frame is provided with at least one hinge arrangement by means of which the supporting frame can be divided in the supporting direction. As a result, the supporting frame can be converted into a folded resting position. Similarly to the cross struts described, the supporting frame can also be positioned releasably between the opposite side edges of the receiving pocket so that it can be removed or installed as needed.

In certain preferred embodiments of the invention, the hinge arrangement is provided with stops that hold the hinge arrangement in the functional position of the supporting frame in a top dead center position. The supporting frame also has the same advantages as far as the hinge arrangement is concerned as the (at least two) cross struts according to the embodiment described above.

A goal that forms a basis of the invention is also achieved for a stowage device in the form of a mesh net by the fact that a plurality of receiving pockets located side by side is provided in the mesh net, said pockets being designed to be open on the same side. As a result, a mesh net like that already described in the older German patent applications 197 32 403. 7 and 197 32 404. 5 is improved in that a plurality of stowage compartments is produced for different objects. This solution is especially advantageous for stowing objects that can be readily damaged (glass objects or the like) since such objects can be stowed separately.

In certain preferred embodiments of the invention, the mesh net has a front and a rear net wall that are connected with one another both at a bottom and at their outer sides, and the two net walls are also connected continuously with one another along at least one separating line at a distance from the outer sides, from the bottom up to the side edges of the open side. As a result, the mesh net is divided into a plurality of pockets by simple means. Advantageously, the separating line is produced by suitable seams or by textile strips connected with one another, which are preferably wrapped around the upper side edges. The textile strips are preferably also sewn together. Preferably, securing devices in the form of push buttons or the like can also be provided on the separating strips that are formed. These push buttons or the like hold the mesh net together in a rolled-up position. Such a mesh net that can be rolled up is basically already disclosed in DE 197 32 403. 7 or 197 32 404. 5.

In certain preferred embodiments of the invention, linear pulling means run inside the side edges of the open side, said means being provided with mounting loops at at least two points spaced apart from one another, and hanging hooks are attached to the mounting loops. As a result it is possible to hang the stowage device in the form of a pocket arrangement on the upper edge area of a larger container, especially a shopping cart or the like, so that the pocket arrangement can be used in simple fashion both for shopping and also subsequently for transporting the purchased goods in a motor vehicle.

Additional advantages and features of the invention follow from the claims as well as from the following description of preferred embodiments of the invention shown in the drawings.

DETAILED DESCRIPTION OF THE DRAWINGS

Figure 1:
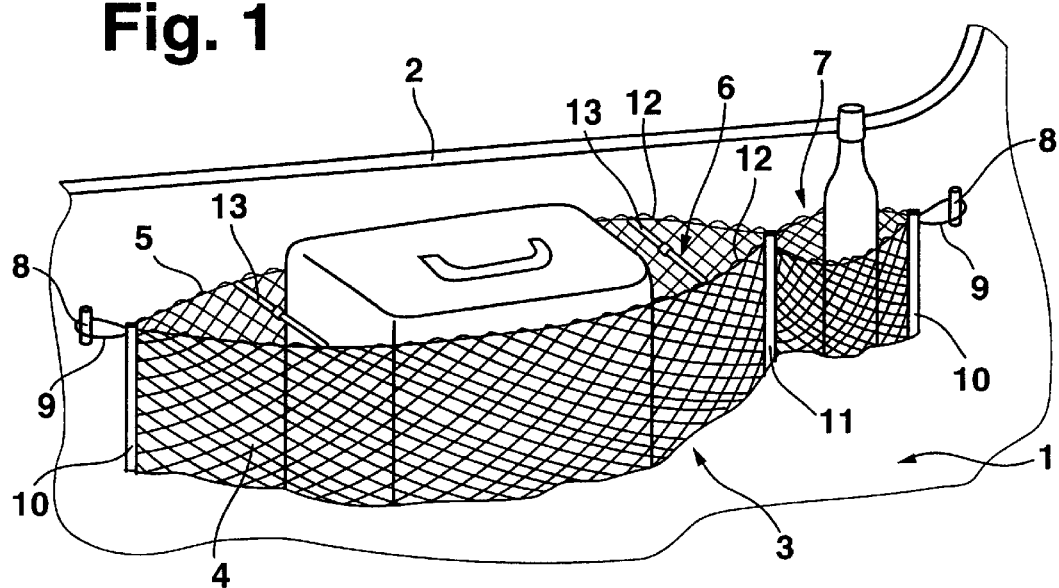
FIG. 1 shows in a perspective view a section of a trunk of an automobile in which one embodiment of the stowage device according to the invention is located.

An automobile, as shown in FIGS. 1 to 7, has a trunk or cargo compartment 1 delimited on one side by at least one wall, by a rear wall 2 in the embodiment according to FIG. 1. In the embodiment shown, a stowage device in the form of a pocket arrangement 3 is positioned in the vicinity of rear wall 2. Pocket arrangement 3 can be located in similar fashion on other walls of the cargo compartment or trunk, said walls preferably allowing simple access to pocket arrangement 3.

Pocket arrangement 3 is designed as a mesh net, with the basic structure of the mesh net corresponding to the storage nets described in the not previously published German patent applications 197 32 403. 7 and 197 32 404. 5. As for the parts and functions of the pocket arrangements described in greater detail below with reference to FIGS. 1 to 16 and not expressly referred to below, attention is also directed to the disclosures in the abovementioned patent applications.

The flexible pocket arrangement 3 has a front net wall 4 as well as a rear net wall 5, which in this embodiment are shown as merged with one another in one piece in a bottom area and are connected with one another on opposite outer sides with the aid of edge strips 10. Net walls 45 however can also be designed in similar fashion as separate sections joined together in the bottom area by corresponding frame edges. Pocket arrangement 3 is left open on one side, the upper side in the embodiments described, with the open side being delimited by upper side edges 12. Side edges 12 have pull cords 12 that are made elastic or inelastic, said cords being guided in the side edges in such fashion that corresponding mesh portions of the net walls are engaged by pull cords 12 and are connected below pull cords 12 with the respective net walls 4, 5, preferably by sewing. On opposite sides, the linear tensioning devices in the form of pull cords 12 each have a mounting loop 9 that projects outward freely from the side edges. Since pull cords 12 are secured movably in the side edges of net walls 4, 5 in the lengthwise direction, the side edges can be pulled together, with the loops 9 each being pulled outward. The loops 9 are secured to mounts 8 integral with the vehicle, designed as T-shaped anchor elements. The T-shaped anchor elements are integral with the body. In this embodiment, they are permanently attached to rear wall 2.

The pocket arrangement 3 according to FIG. 1 forms two receiving pockets 6, 7 with a larger one being a main pocket 6 and a small one being an auxiliary pocket 7. Pocket arrangement 3 is divided into two receiving pockets 6, 7 in simple fashion by a seam 11, with the front and rear net walls 4, 5 being continuously connected with one another along a separating line that is parallel to the edge strips 10. Seam 11 is formed by a textile strip that is wrapped around the upper side edges 12 and is brought down to the bottom area of pocket arrangement 3. The opposite parts of the textile strip are sewed together continuously in simple fashion or connected with one another in another fashion.

Securing devices in the form of push buttons or other elements already disclosed in the patent applications mentioned above can be provided on the edge strips 10 and/or the seam 11, by which devices the pocket arrangement 3 can be rolled up and secured in the rolled-up position.

Figure 2:
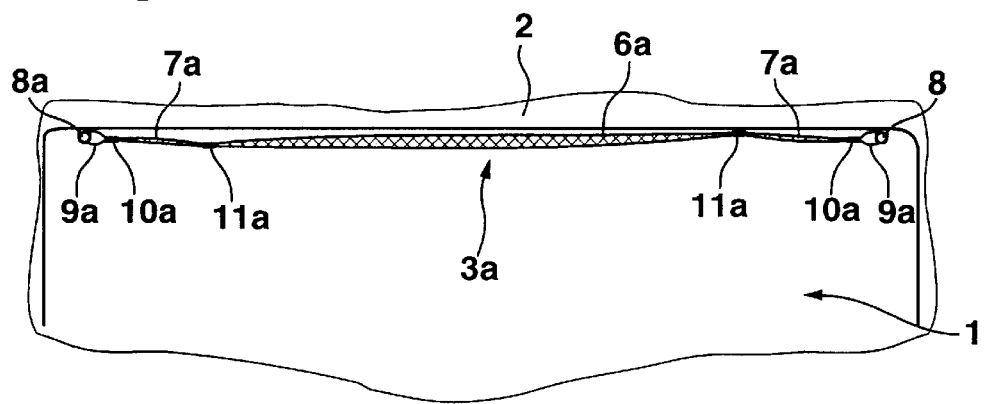
FIG. 2 is a schematic top view of a trunk of an automobile containing another embodiment of the stowage device according to the invention in an unloaded resting position.
Figure 3:
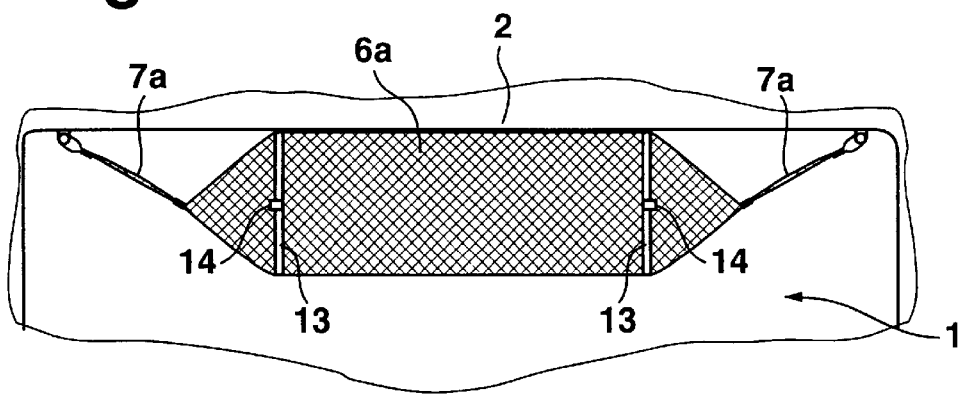
FIG. 3 shows the stowage device according to FIG. 2 in a functional position in which it can be loaded.
Figure 4:
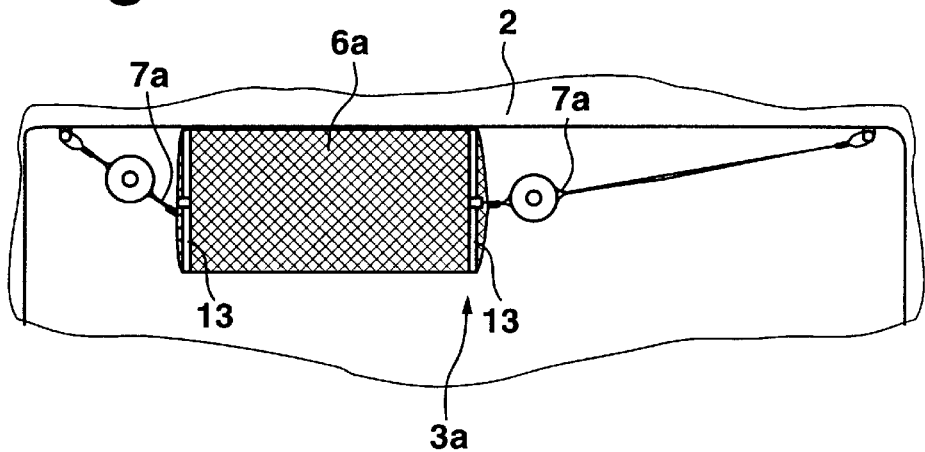
FIG. 4 shows another stowage device similar to FIG. 3 in a partially loaded functional position.
Figure 5:
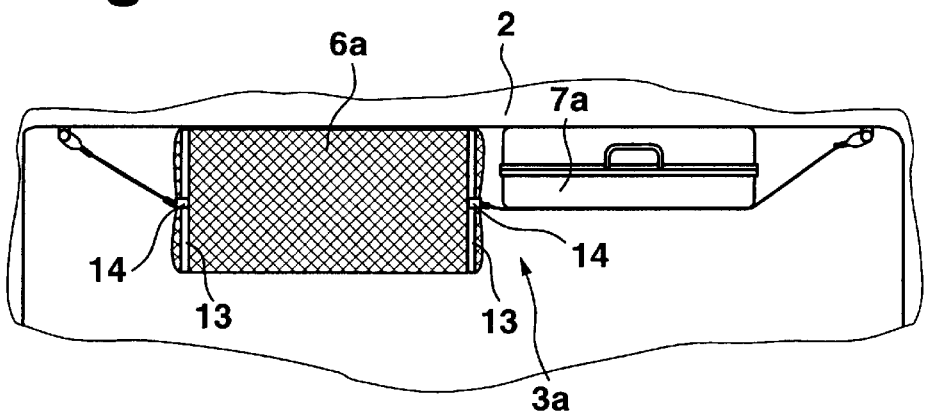
FIG. 5 shows the stowage device according to FIG. 4 with a different stowage version.

The pocket arrangement 3a according to FIGS. 2 to 4 essentially corresponds to the pocket arrangement 3 according to FIG. 1. The pocket arrangement 3a however has two textile strips that serve as seams 11a by means of which the pocket arrangement 3a is divided into a large main pocket 6a and into two auxiliary pockets that flank main pocket 6a on opposite sides. Main pocket 6a serves to receive larger objects such as suitcases or the like. The auxiliary pockets 7a serve to receive glass objects such as bottles or the like.

The pocket arrangement can also be divided into a plurality of receiving pockets by separating areas of a different kind. If the pocket arrangement is formed by film sections, the corresponding film walls can be welded together in simple fashion in the vicinity of the separating line. When the pocket arrangement is made of flat textile structures, a simple continuous seam can be provided in the vicinity of the separating lines without additional textile strips being required for the purpose.

Figure 6:
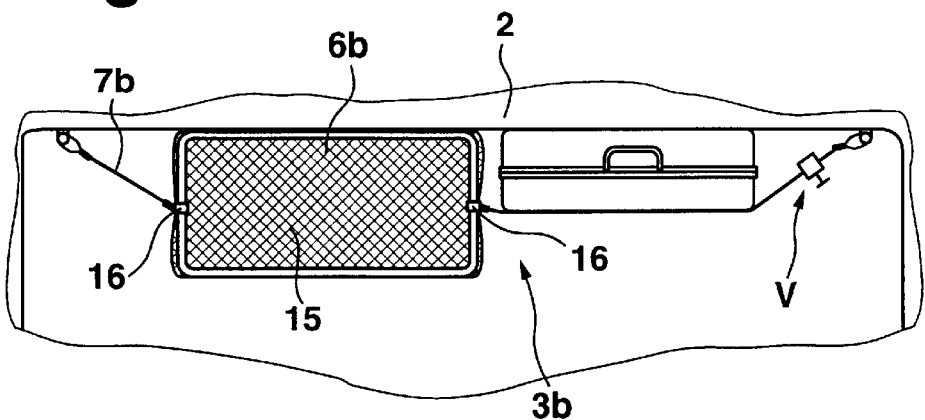
FIG. 6 shows another stowage device similar to that in FIGS. 3 to 5, provided with a continuous supporting frame.

The various pocket arrangements 3a, 3b according to FIGS. 2 to 7 likewise have elastic or inelastic pull cords that become loops 9a. Loops 9a are secured in mounts 8 integral with the vehicle. If the pull cords that serve as tensioning devices are inelastic, the side edges and hence the pull cords can be tightened by means of an adjusting device V as shown in FIG. 6. For this purpose, one of the loops of the pull cords is made adjustable. The reader's attention is directed to DE 197 32 404. 5 and especially the description of FIG. 5 for a more detailed explanation of such an adjusting device.

Figure 13:
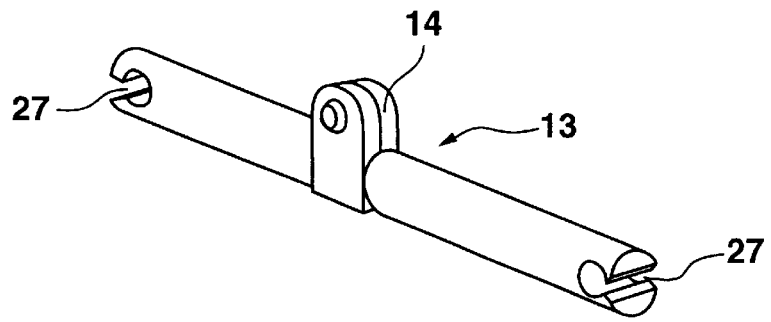
FIG. 13 shows another cross strut similar to those in FIGS. 10 to 12, provided with a hinge arrangement.
Figure 14:
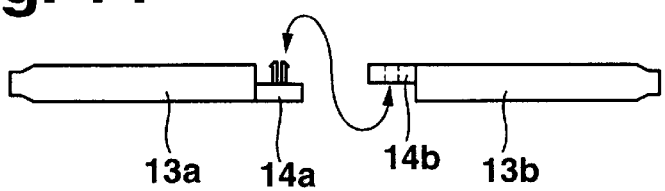
FIG. 14 shows the cross strut in FIG. 13 in an exploded view.
Figure 15:
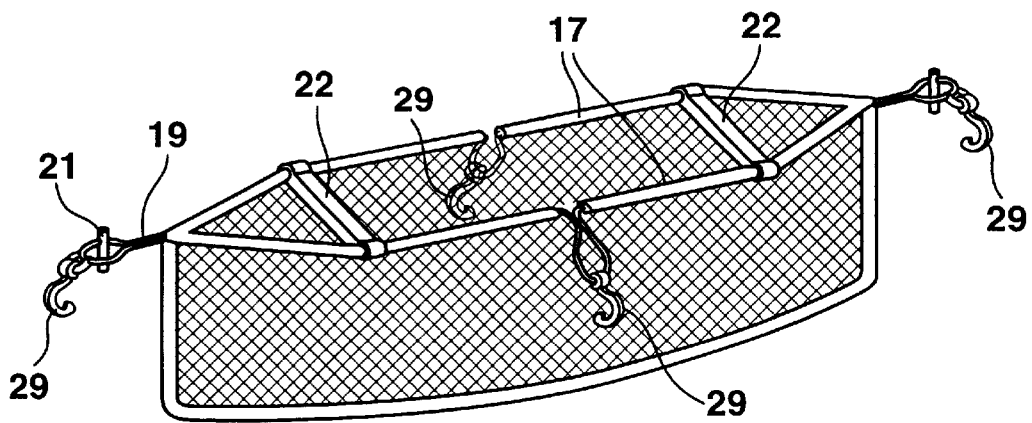
FIG. 15 is a perspective view of another embodiment of the stowage device according to the invention.
Figure 16:
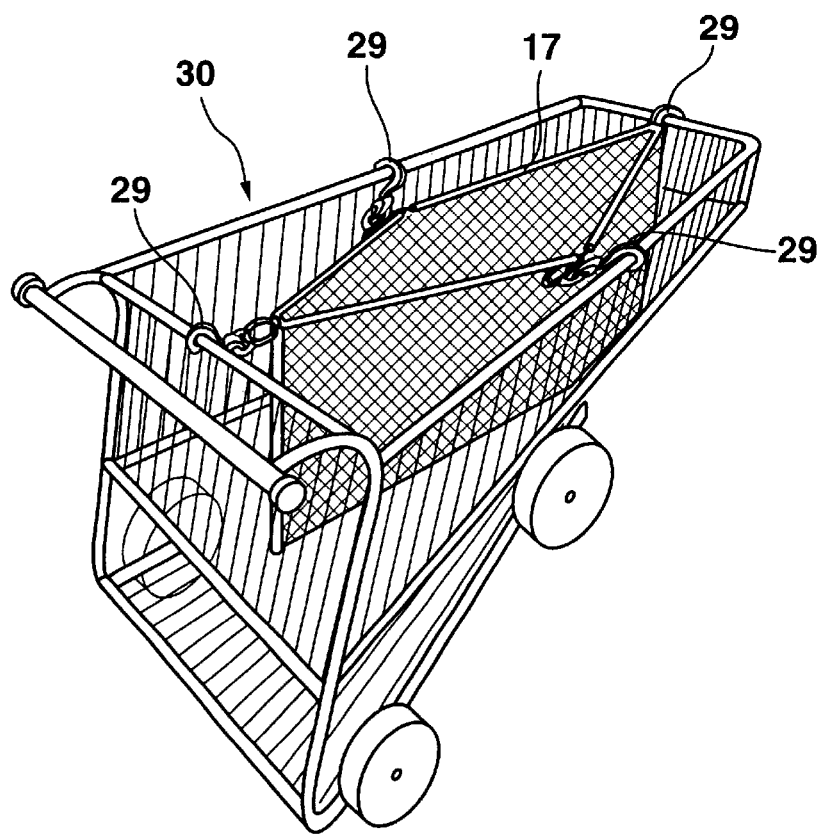
FIG. 16 is an arrangement of a stowage device according to the invention similar to FIG. 15 in a shopping cart.

In order to provide simple access for removing or inserting an object from or into the interior of the pocket of a receiving pocket 6, 6a that serves as the main pocket, even when the pull cords 12 are stretched, the open side of receiving pocket 6, 6a is thus spread by supporting structure in the form of two cross struts 13. Cross struts 13 according to FIGS. 13 and 14 are provided with a hinged arrangement 14 that divides each cross strut 13 into two strut parts 13a and 13b of approximately equal length. The hinged arrangement 14 is so designed that the cross struts 13 can bend transversely with respect to the spreading direction so that they can be moved into a folded position. In the folded position, strut parts 13a and 13b are located parallel to one another (see FIG. 9). The hinged arrangement 14 is formed by hinged parts 14a, 14b, designed in the form of a latch and plug connection that can be released (FIG. 14). In a manner not shown, hinged parts 14a, 14b are so designed that they are secured in a top dead center position indicated in FIG. 13. As a result, the cross struts 13 are prevented from bending outward in their functional positions, causing the opening between the side edges that has been spread apart, to close.

The opposite ends of cross struts 13 are secured releasably or nonreleasably to the side edges of the receiving pocket. In the embodiment according to FIG. 13, each of the ends has a notch 27 provided with insertion bevels and an undercut notch section. The undercut notch section has a circular free cross section adjusted to the thickness of pull cords 12. The ends of cross struts 13 thus can be pushed by their notches 27 onto the pull cords 12 on the opposite side edges, so that they spread the open side in their functional position. In their resting position according to FIG. 9, the cross struts 13 fold up, bending outward and downward, upward, or to the side.

Instead of having cross struts that can bend outward, in the embodiments shown in FIGS. 8, 10 to 12, and 15, rigid cross struts 22 to 25 are provided. These struts, according to FIGS. 10 to 12, can likewise be releasably pushed by suitable notches 26, 27 onto the pull cords in the side edges, so that they extend between the opposite side edges.

Figure 12:
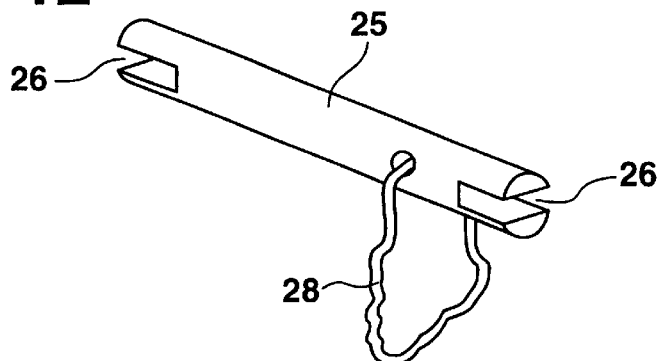

According to FIG. 12, cross strut 25 is additionally provided with protection against loss in the form of a safety cord 28 that is secured in a suitable radial bore in cross strut 25. The free end of safety cord 28 can be tied firmly to a suitable mesh net in the front or rear net wall 4,5, so that cross strut 25 is protected against loss inside the pocket even when not in use.

Figure 7:
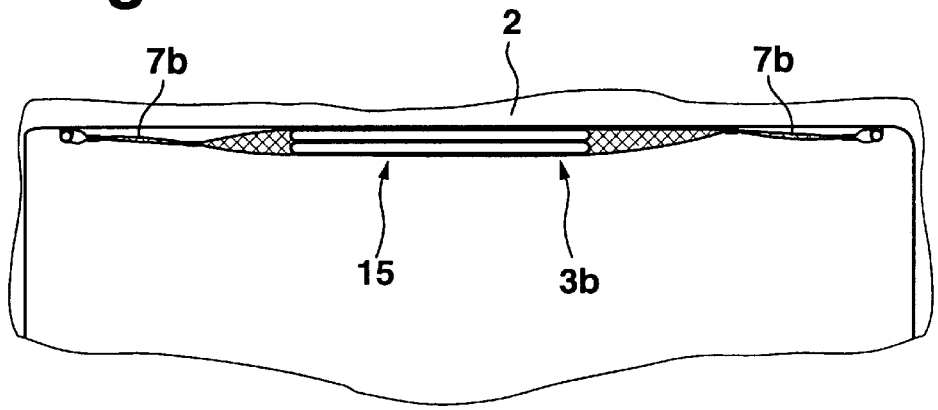
FIG. 7 shows a stowage device similar to that in FIG. 6 in which the supporting frame is shown in its folded resting position.

In the embodiment according to FIGS. 6 and 7, the pocket arrangement 3b has a supporting frame 15, 16 as supporting structure, with the function of this frame essentially corresponding to the cross struts described above. The support frame is rectangular in shape and in addition to its lateral hinged legs, whose function corresponds to that of the cross struts described above, also has connecting struts on the front and rear that connect the opposite hinged legs integrally with one another. The connecting struts extend along the side edges of the net walls. The supporting frame, like the cross struts 13 described previously, is provided with a hinged arrangement 16 that divides the supporting frame into two halves, with the support frame bending transversely to the spreading direction by means of hinged arrangement 16 (FIG. 7). The supporting frame 15 then preferably bends downward. Supporting frame 15, like the cross struts, is connected in the vicinity of the upper side edges with the front and rear net walls. For this purpose, loops can be provided that are not shown in greater detail, said loops fitting around the side edges and the connecting struts of the supporting frame without preventing a folding movement of support frame 15. The opposite connecting struts of supporting frame 15 can also be provided with extensions that project outward, each of said extensions in turn being provided with notches similar to those in FIGS. 10 to 13 in certain preferred embodiments of the invention. In embodiments of the invention, not shown, the supporting frame is made rigid without a hinged arrangement. The connection to the opposite side edges is made in a manner similar to that just described.

As can also be seen from FIGS. 6 and 7, a part of pocket arrangement 3a which is shown at the right in the drawings can be designed as an elastic tensioning strip or tensioning flat structure, which permits a bulky object such as a suitcase or the like to be gripped firmly and secured against rear wall 2.

Figure 8:
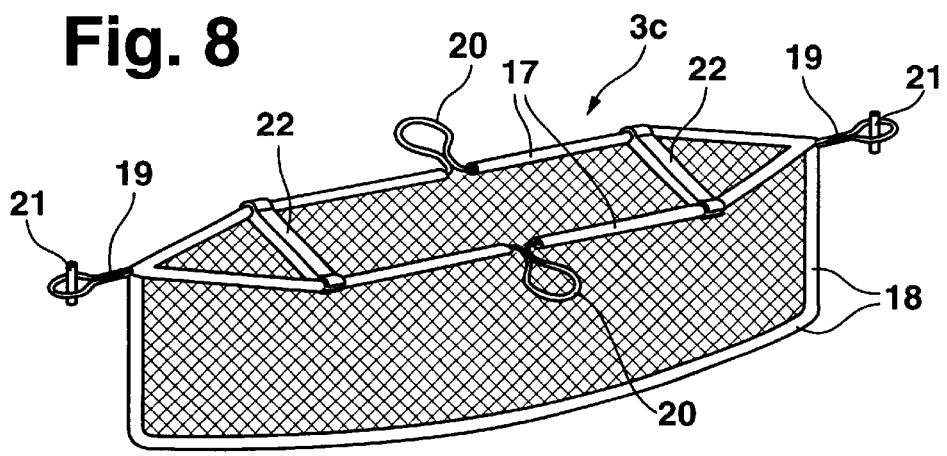
FIG. 8 is a perspective view of another embodiment of a stowage device according to the invention, which is generally similar to the FIG. 1 embodiment.
Figure 9:
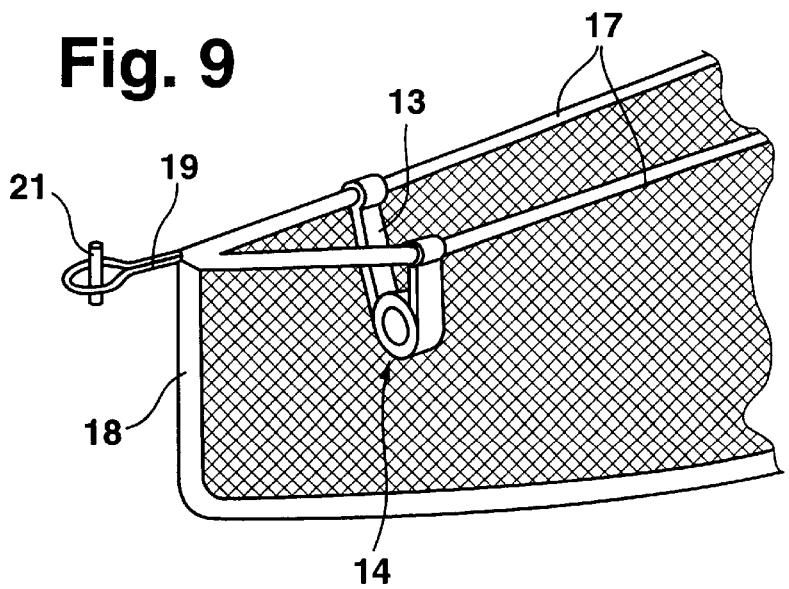
FIG. 9 is a perspective view of a portion of a stowage device with a cross strut that can be folded.
Figure 10:
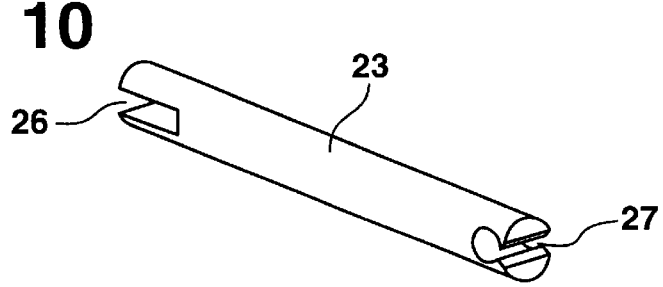
FIGS. 10 to 12 show various types of cross struts that can serve as supporting structure for an embodiment of the stowage device according to the invention according to FIG. 8.
Figure 11:
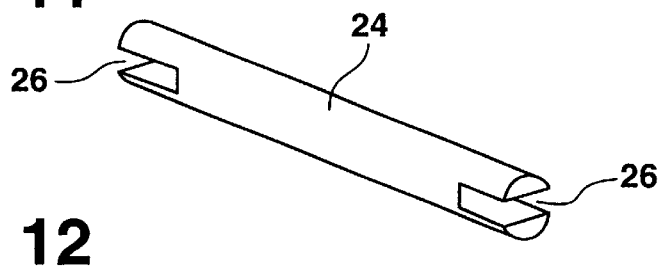

In the embodiments shown in FIGS. 8 and 9, opposite mounting loops 19 formed by the linear tensioning structure in the upper side edges, are provided directly with T-shaped anchor elements 21 by means of which they can be hung in loops that are integral with the vehicle but are not shown in greater detail. The loops that are integral with the vehicle can be made elastic or inelastic. In the embodiment shown in FIG. 8, the linear tensioning structure in the form of pull cords, half way up each and opposite one another, also form two additional mounting loops 20 each of which projects outward. These loops can be used as handles if the pocket arrangement is used as a shopping bag that is removed from the motor vehicle and replaced.

For this purpose, both the mounting loops 19 and the handle loops 20 can also be provided with hanging hooks 29 (FIGS. 15 and 16), that represent stable parts. Hanging hooks 29 are connected releasably or non-releasably with the respective loops 19, 20. By means of hanging hooks 29 it is possible to stretch the pocket arrangement between corresponding lattice walls of a shopping cart 30. After shopping has been completed, the pocket arrangement with the objects purchased inside can be placed in the vehicle and anchored securely to the vehicle in accordance with the embodiments described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Stowage device for a releasable arrangement in a motor vehicle, with at least one flexible receiving pocket that allows access to the interior of the receiving pocket from one open side, wherein an open side of the receiving pocket has support structure associated with the receiving pocket which spreads the open side into a functional position that allows access to the interior of the receiving pocket, wherein the support structure comprises two cross struts that are spaced apart from one another, extend between opposite side edges of the receiving pocket and are connected in use directly with flexible walls of the receiving pocket, said cross struts being rigid at least in the functional position, wherein each of the cross struts extends substantially linearly between said opposite side edges of the receiving pocket when in the functional position, wherein each cross strut is designed to be foldable by means of at least one hinged arrangement, and wherein the ends of the cross struts are provided with notches for positioning the ends on the side edges.

2. Stowage device according to claim 1, wherein the cross struts are mounted releasably to the side edges.

3. Stowage device according to claim 2, wherein the cross struts are secured to the receiving pocket by means of a securing device which prevents loss of the cross strut.

4. Stowage device according to claim 1, wherein the cross struts are secured to the receiving pocket by means of a securing device which prevents loss of the cross strut.

5. Stowage device according to claim 1, wherein the hinged arrangement is designed as a latching connection which divides the cross strut into two strut parts separate from one another.

6. Stowage device according to claim 1, wherein the hinged arrangement is provided with stops securing the hinged arrangement in its functional position in a top dead center position.

7. Stowage device according to claim 5, wherein the hinged arrangement is provided with stops securing the hinged arrangement in its functional position in a top dead center position.

8. Stowage device according to claim 2, wherein T-shaped anchor elements associated with mounting loops for the receiving pocket are provided for anchoring the receiving pocket to a vehicle.

9. Stowage device according to claim 1, wherein T-shaped anchor elements associated with mounting loops for the receiving pocket are provided for anchoring the receiving pocket to a vehicle.

10. Stowage device for a releasable arrangement in a motor vehicle, with at least one flexible receiving pocket that allows access to the interior of the receiving pocket from one open side, wherein an open side of the receiving pocket has support structure associated with the receiving pocket which spreads the open side into a functional position that allows access to the interior of the receiving pocket, wherein the support structure comprises two cross struts that are spaced apart from one another, extend between opposite side edges of the receiving pocket and are connected in use directly with flexible walls of the receiving pocket, said cross struts being rigid at least in the functional position, wherein each of the cross struts extends substantially linearly between said opposite side edges of the receiving pocket when in the functional position, wherein each cross strut is designed to be foldable by means of at least one hinged arrangement, wherein said stowage device is designed as a mesh net, and wherein a plurality of receiving pockets are provided side by side in the mesh net, said pockets been made open on the same side.

11. Stowage device according to claim 10, wherein the mesh net has a front net wall as well as a rear net wall that are connected with one another at a bottom as well as at their outer sides, and wherein the two net walls are also continuously connected with one another along at least one separating line at a distance from the outer sides from the bottom to the side edges of the open side.

12. Stowage device according to claim 10, wherein the receiving pockets are made with different widths.

13. Stowage device according to claim 11, wherein the receiving pockets are made with different widths.

14. Stowage device according to claim 10, wherein tensioning structure extends in the side edges of the open side, said tensioning structure being provided with mounting loops at at least two points spaced apart from one another, and wherein hanging hooks are secured to the mounting loops.

15. Stowage device for a releasable arrangement in a motor vehicle, with at least one flexible receiving pocket that allows access to the interior of the receiving pocket from one open side, wherein an open side of the receiving pocket has support structure associated with the receiving pocket which spreads the open side into a functional position that allows access to the interior of the receiving pocket, wherein the support structure comprises two cross struts that are spaced apart from one another, extend between opposite side edges of the receiving pocket and are connected in use directly with flexible walls of the receiving pocket, said cross struts being rigid at least in the functional position, wherein each of the cross struts extends substantially linearly between said opposite side edges of the receiving pocket when in the functional position, wherein each cross strut is designed to be foldable by means of at least one hinged arrangement, wherein tensioning structure extends in the side edges of the open side, said tensioning structure being provided with mounting loops at at least two points spaced apart from one another, and wherein hanging hooks are secured to the mounting loops.

16. Stowage device for a releasable arrangement in a motor vehicle, with at least one flexible receiving pocket that allows access to the interior of the receiving pocket from one open side, wherein an open side of the receiving pocket has support structure associated with the receiving pocket which spreads the open side into a functional position that allows access to the interior of the receiving pocket, wherein the support structure comprises two cross struts that are spaced apart from one another, extend between opposite side edges of the receiving pocket and are connected in use directly with flexible walls of the receiving pocket, said cross struts being rigid at least in the functional position, wherein each of the cross struts extends substantially linearly between said opposite side edges of the receiving pocket when in the functional position, wherein each cross strut is designed to be foldable by means of at least one hinged arrangement, wherein T-shaped anchor elements associated with mounting loops for the receiving pocket are provided for anchoring the receiving pocket to a vehicle.

17. Stowage device for a releasable arrangement in a motor vehicle, with at least one flexible receiving pocket that allows access to the interior of the receiving pocket from one open side, wherein an open side of the receiving pocket has support structure associated with the receiving pocket which spreads the open side into a functional position that allows access to the interior of the pocket, wherein the support structure includes at least one cross strut which extends between opposite side edges of the receiving pocket and is connected in use directly with flexible walls of the receiving pocket, said at least one cross strut being rigid at least in the functional position, wherein each cross strut is designed to be foldable by means of at least one hinged arrangement, wherein each of the at least one cross strut extends substantially linearly between said opposite side edges of the receiving pocket when in the functional position, and wherein the ends of the cross struts are provided with notches for positioning the ends on the side edges.

18. Stowage device according to claim 17,
wherein said at least one cross strut includes two cross struts that are spaced apart from one another.

19. Stowage device according to claim 17, wherein the cross struts are mounted releasably to the side edges.

20. Stowage device according to claim 17, wherein the hinged arrangement is designed as a latching connection which divides the cross strut into two strut parts separate from one another.

21. Stowage device according to claim 17, wherein the hinged arrangement is provided with stops securing the hinged arrangement in its functional position in a top dead center position.

22. Stowage device according to claim 20, wherein the hinged arrangement is provided with stops securing the hinged arrangement in its functional position in a top dead center position.

23. Stowage device according to claim 17, wherein the hinged arrangement is designed as a latching connection which divides the cross strut into two strut parts separate from one another.

24. Stowage device according to claim 17, wherein the hinged arrangement is provided with stops securing the hinged arrangement in its functional position in a top dead center position.

25. Stowage device according to claim 23, wherein the hinged arrangement is provided with stops securing the hinged arrangement in its functional position in a top dead center position.

26. Stowage device according to claim 17, wherein said cross struts are configured to be releasably connectable with upper edges of the flexible walls of the receiving pocket.

27. Stowage device according to claim 17, wherein said at least one cross strut is configured to be releasably connectable with upper edges of the flexible walls of the receiving pocket.

28. Stowage device for a releasable arrangement in a motor vehicle, with at least one flexible receiving pocket that allows access to the interior of the receiving pocket from one open side, wherein an open side of the receiving pocket has support structure associated with the receiving pocket which spreads the open side into a functional position that allows access to the interior of the receiving pocket, wherein the support structure comprises two cross struts that are spaced apart from one another, extend between opposite side edges of the receiving pocket, and are rigid at least in the functional position, wherein each of the cross struts extends substantially linearly between said opposite side edges of the receiving pocket when in the functional position, wherein each cross strut is designed to be foldable by means of at least one hinged arrangement, and wherein the ends of the cross struts are provided with notches for positioning the ends on the side edges.

29. Stowage device for a releasable arrangement in a motor vehicle, with at least one flexible receiving pocket that allows access to the interior of the receiving pocket from one open side, wherein an open side of the receiving pocket has support structure associated with the receiving pocket which spreads the open side into a functional position that allows access to the interior of the receiving pocket, wherein the support structure comprises two cross struts that are spaced apart from one another, extend between opposite side edges of the receiving pocket, and are rigid at least in the functional position, wherein each of the cross struts extends substantially linearly between said opposite side edges of the receiving pocket when in the functional position, wherein each cross strut is designed to be foldable by means of at least one hinged arrangement, wherein said stowage device is designed as a mesh net, and wherein a plurality of receiving pockets are provided side by side in the mesh net, said pockets been made open on the same side.

30. Stowage device for a releasable arrangement in a motor vehicle, with at least one flexible receiving pocket that allows access to the interior of the receiving pocket from one open side, wherein an open side of the receiving pocket has support structure associated with the receiving pocket which spreads the open side into a functional position that allows access to the interior of the receiving pocket, wherein the support structure comprises two cross struts that are spaced apart from one another, extend between opposite side edges of the receiving pocket, and are rigid at least in the functional position, wherein each of the cross struts extends substantially linearly between said opposite side edges of the receiving pocket when in the functional position, wherein each cross strut is designed to be foldable by means of at least one hinged arrangement, wherein tensioning structure extends in the side edges of the open side, said tensioning structure being provided with mounting loops at at least two points spaced apart from one another, and wherein hanging hooks are secured to the mounting loops.

31. Stowage device for a releasable arrangement in a motor vehicle, with at least one flexible receiving pocket that allows access to the interior of the receiving pocket from one open side, wherein an open side of the receiving pocket has support structure associated with the receiving pocket which spreads the open side into a functional position that allows access to the interior of the receiving pocket, wherein the support structure comprises two cross struts that are spaced apart from one another, extend between opposite side edges of the receiving pocket, and are rigid at least in the functional position, wherein each of the cross struts extends substantially linearly between said opposite side edges of the receiving pocket when in the functional position, wherein each cross strut is designed to be foldable by means of at least one hinged arrangement, wherein T-shaped anchor elements that are integral with one of the pocket and the vehicle are associated with mounting loops for the receiving pocket.

32. Stowage device, for a releasable arrangement in a motor vehicle, with at least one flexible receiving pocket that allows access to the interior of the receiving pocket from one open side, wherein an open side of the receiving pocket has support structure associated with the receiving pocket which spreads the open side into a functional position that allows access to the interior of the pocket, wherein the support structure includes at least one cross strut which extends between opposite side edges of the receiving pocket and is rigid at least in the functional position, wherein each cross strut is designed to be foldable by means of at least one hinged arrangement, wherein each of the at least one cross strut extends substantially linearly between said opposite side edges of the receiving pocket when in the functional position, and wherein the ends of the cross struts are provided with notches for positioning the ends on the side edges.

* * * * *